United States Patent
Niwa et al.

(10) Patent No.: US 7,602,981 B2
(45) Date of Patent: Oct. 13, 2009

(54) IMAGE STORAGE AND DISPLAY SYSTEM, MAINTENANCE SYSTEM THEREFOR, AND IMAGE STORAGE AND DISPLAY METHOD

(75) Inventors: Kenichi Niwa, Otawara (JP); Takashi Kondo, Otawara (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 861 days.

(21) Appl. No.: 11/073,648

(22) Filed: Mar. 8, 2005

(65) Prior Publication Data

US 2005/0238255 A1   Oct. 27, 2005

(30) Foreign Application Priority Data

Mar. 9, 2004 (JP) .............................. 2004-066257

(51) Int. Cl.
| | |
|---|---|
| G06K 9/00 | (2006.01) |
| G06K 9/36 | (2006.01) |
| G06K 9/46 | (2006.01) |
| G06K 9/54 | (2006.01) |
| G06K 9/60 | (2006.01) |
| H04N 7/173 | (2006.01) |
| H04N 7/16 | (2006.01) |
| G06F 15/16 | (2006.01) |
| H04N 7/12 | (2006.01) |
| H04N 11/02 | (2006.01) |
| H04N 11/04 | (2006.01) |

(52) U.S. Cl. ..................... 382/239; 382/128; 382/305; 725/105; 725/135; 725/143; 375/240.01; 709/203; 709/217; 709/219; 709/247

(58) Field of Classification Search ................ 382/128, 382/239, 305; 725/105, 135, 143; 375/240.01; 709/203, 217, 219, 247

See application file for complete search history.

(56) References Cited

U.S. PATENT DOCUMENTS

| | | | | |
|---|---|---|---|---|
| 5,748,342 | A * | 5/1998 | Usami | 358/500 |
| 6,560,631 | B1 * | 5/2003 | Ishihara et al. | 709/201 |
| 6,658,167 | B1 * | 12/2003 | Lee et al. | 382/305 |
| 6,771,822 | B1 | 8/2004 | Brackett | |

(Continued)

FOREIGN PATENT DOCUMENTS

| | | |
|---|---|---|
| JP | 2002-232880 | 8/2002 |
| JP | 2002-352220 | 12/2002 |
| JP | 2004-112360 | 4/2004 |

OTHER PUBLICATIONS

Boliek, Christopoulous, and Majani, "Coding of Still Pictures—JPEG 2000 Part I Final Commitee Draft Version 1.0", ISO/IEC Mar. 16, 2000, JPEG & JBIG—Joing Bi-Level Image Experts Ground and Joing Photography Experts Group.*

Primary Examiner—Matthew C Bella
Assistant Examiner—Nathan Bloom
(74) Attorney, Agent, or Firm—Oblon, Spivak, McClelland, Maier & Neustadt, L.L.P.

(57) ABSTRACT

The invention provides an image storage and display system including: an image storage server that includes an image file storing unit for storing image data; and image display terminals that are connected to the image storage server via a network and display an image sent from the image storage server. In the image storage and display system, the image storage server includes: an information managing unit that acquires and manages information on a system including at least one of environmental information and operation information of the system; and an image file compressing unit that sets an optimum compression ratio on the basis of the information to compress the image and stores the image in the image file storing unit. According to the constitution, it is possible to reduce time for, for example, adjustment of a compression ratio of an image by a user or a service person by automatically optimizing the compression ratio.

17 Claims, 15 Drawing Sheets

U.S. PATENT DOCUMENTS

| | | | |
|---|---|---|---|
| 7,358,988 B1 * | 4/2008 | Konishi et al. | 348/222.1 |
| 2002/0025084 A1 * | 2/2002 | Yang et al. | 382/299 |
| 2002/0073429 A1 * | 6/2002 | Beane et al. | 725/105 |
| 2002/0099853 A1 * | 7/2002 | Tsujii et al. | 709/247 |
| 2002/0122075 A1 * | 9/2002 | Karasawa et al. | 345/846 |
| 2002/0128873 A1 * | 9/2002 | Shimizu et al. | 705/3 |
| 2003/0076312 A1 * | 4/2003 | Yokoyama | 345/204 |
| 2004/0045030 A1 * | 3/2004 | Reynolds et al. | 725/110 |
| 2004/0090539 A1 * | 5/2004 | Kim et al. | 348/231.1 |
| 2004/0160967 A1 | 8/2004 | Fujita et al. | |
| 2005/0120128 A1 * | 6/2005 | Willes et al. | 709/232 |
| 2005/0135662 A1 * | 6/2005 | Vining et al. | 382/128 |

* cited by examiner

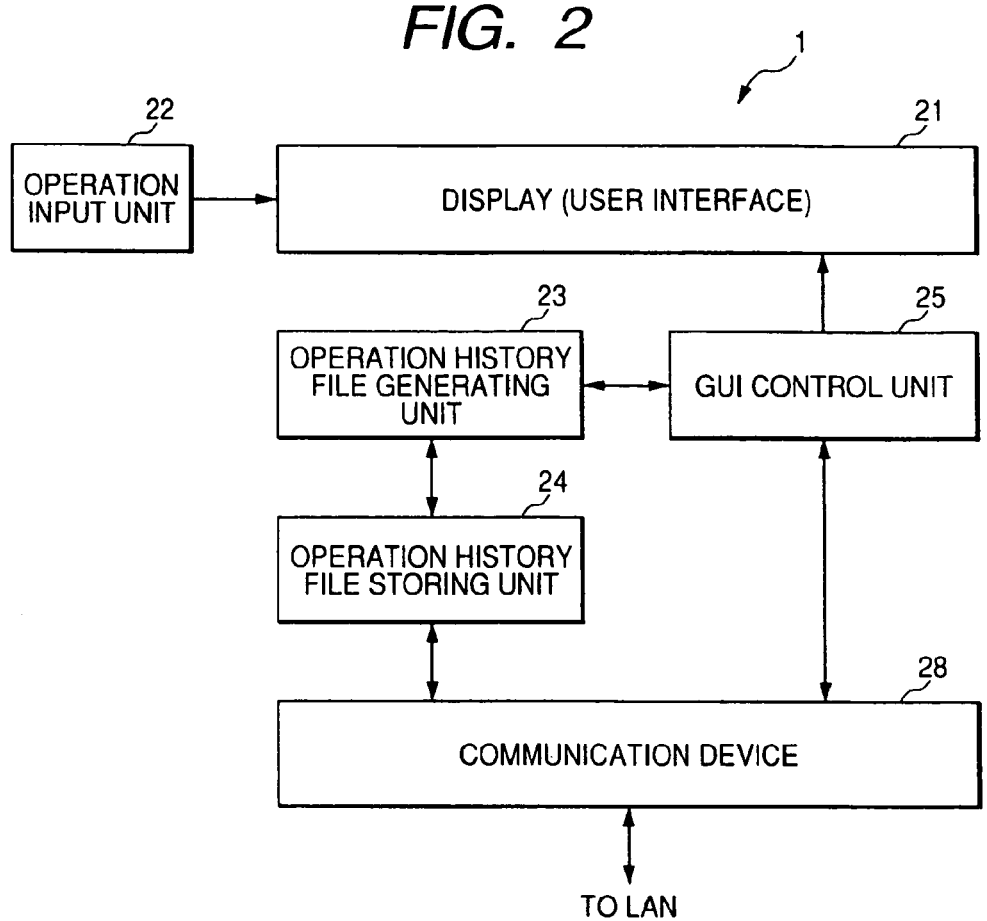

[COMPRESSION RATIO]    20%    50%    80%

| [COMPRESSION METHOD] | JPEG | JPEG2K | JPEG |
|---|---|---|---|
| [COMPRESSION PARAMETER] | Q=20 | rate=10% | Q=80 |

| [FILE SIZE] | 50K | 60K | 70K |
|---|---|---|---|

FIG. 10A

| CLIENT VIEWER | | 1-1 | | 1-2 | |
|---|---|---|---|---|---|
| USER | A | B | C | D | E |
| COMPRESSION METHOD<br>COMPRESSION RATIO | JPEG<br>10% | JPEG2K<br>20% | JPEG<br>50% | JPEG2K<br>30% | JPEG<br>40% |

FIG. 10B

| CLIENT VIEWER | | 1-1 | | | | DR | |
|---|---|---|---|---|---|---|---|
| MODALITY | | CT | | MR | | DR | |
| USER | A | B | C | A | C | B | C |
| COMPRESSION METHOD<br>COMPRESSION RATIO | JPEG<br>10% | JPEG2K<br>20% | JPEG<br>50% | JPEG2K<br>30% | JPEG<br>40% | JPEG2K<br>25% | JPEG<br>33% |

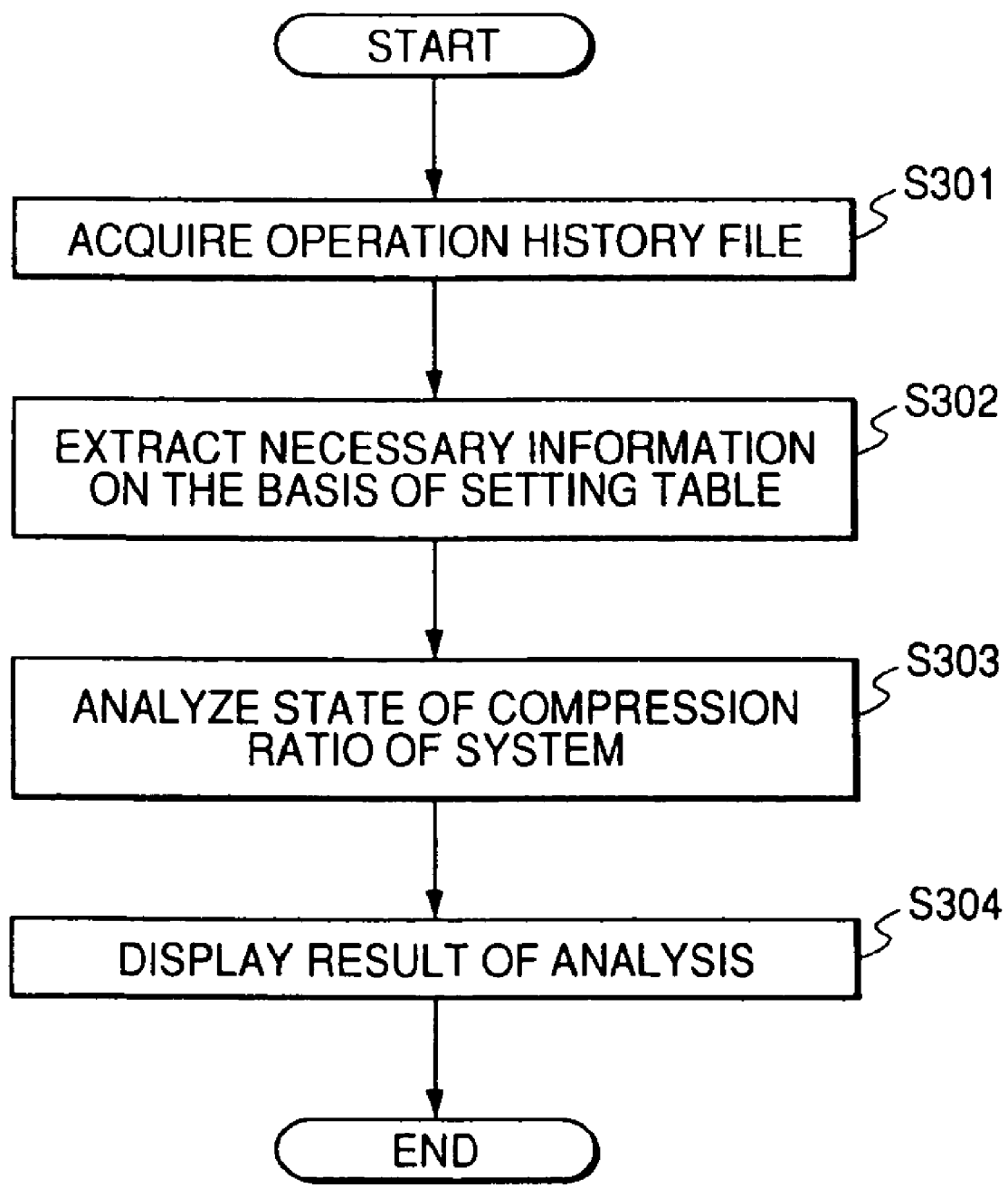

IMAGE STORAGE AND DISPLAY SYSTEM, MAINTENANCE SYSTEM THEREFOR, AND IMAGE STORAGE AND DISPLAY METHOD

BACKGROUND OF THE INVENTION

1. Field of the Invention

The present invention relates to an image storage and display system including an image server, which stores image data, and a display terminal, which is connected to the image server via a network, and an image storage and display method that is executed by the image storage and display system. The invention also relates to a maintenance system that maintains such an image storage and display system with remote control.

2. Description of the Related Art

In the medical field, various diagnostic image generating apparatuses (modalities) using an X-ray computed tomographic (CT) apparatus, an X-ray Digital Radiography (DR) apparatus, and a magnetic resonance imaging (MRI) apparatus, an ultrasonic diagnostic apparatus, and the like are used. Image data generated by these modalities are displayed on display devices such as CRTs and LCDs and used for various diagnoses in medical sites.

In accordance with advances of the communication technologies and the computer technologies in recent years, a network using computers is established in a hospital. Moreover, the network is connected to institutions on the outside such as diagnostic reading centers and system maintenance companies. In this case, the modalities and the CRTs and the LCDs constitute a part of the network as image input apparatuses and the image display terminals, respectively.

Other than the image input devices and the image output devices, this network includes an image server including a storage such as a hard disk for storing image data generated by the image input devices. The image display terminals acquire images from the image server as required and display the images. Then, users like doctors and nurses change qualities, arrangements, display information, and the like of the images and refer to or diagnostically read the images to determine and confirm medical policies for patients.

In order to store image data as much as possible in the storage of the image server, usually, compressed image data are stored. The image display terminals request the compressed images from the image server via the network and expand the acquired compressed image to display medical images. A compression method and a compression ratio used for the compression are determined at the time of system construction, that is, before operation is started.

In such a system, an image characteristic may be different for each of the modalities and a resolution may be different for each of the image display terminals. Thus, considerably long time is required for initial adjustment of parameters such as the compression ratio that affect a quality of images.

However, after the parameters such as the compression ratio are set at the time of system construction, it is impossible to confirm whether the setting is correct. Therefore, the parameters are used without change even if the parameters are not optimum parameters. In addition, even if a change of the parameters is required in operation, since it is not clear according to what kind of standard and information the parameters should be changed, the parameters cannot be changed optimally. For example, it is inefficient to store an image according to a compression method with a low compression ratio in order to give priority to a quality of the image, because a large storage area is required. Conversely, if priority is given to efficiency of a storage, a user may be dissatisfied because an image quality is low.

Therefore, under the present situation, at the time of diagnostic reading of an image, the user adjusts the compression ratio of the image with reference to various kinds of image information every time when the user is dissatisfied with a quality of the restored image.

On the other hand, for example, JP-A-2002-352220 proposes an image storage system having the object of transferring image data promptly. In the image storage system, an image server generates image data of three versions, namely, original image data Sorg and irreversible compressed image data S1 and S2, for one image, and temporarily stores the image data in a storage medium. A work station connected to the image server via a network designates a version of image data to be acquired. The image data of the designated version is temporarily read out from the storage medium and transferred to the work station and an image based on the image data is displayed on a monitor.

In this system, it is possible to temporarily delete the original image data Sorg from the storage medium after a predetermined period has elapsed by storing the original image data Sorg in an archive. However, this only makes it possible to select one of two kinds of images of different compression ratios but does not make it possible to designate a compression ratio. Thus, it is still impossible to set an optimum compression ratio.

SUMMARY OF THE INVENTION

The invention has been devised in view of the circumstances described above and it is an object of the invention to provide an image storage and display system and an image storage and display method that can reduce time for, for example, adjustment of a compression ratio of an image by a user or a service person by automatically optimizing the compression ratio.

It is another object of the invention to provide an image storage and display system that, even if the image storage and display system is forced to change a compression ratio after optimization, can cope with the change easily and can automatically set an optimum compression ratio in the present system operation.

It is still another object of the invention to provide a maintenance system that can maintain such an image storage and display system with remote control.

In order to solve the problems, an image storage and display system according to the invention is an image storage and display system including: an image storage server that includes an image file storing unit for storing image data; and image display terminals that are connected to the image storage server via a network and display an image sent from the image storage server. In the image storage and display system, the image storage server includes: an information managing unit that acquires and manages information on a system including at least one of environmental information and operation information of the system; and an image file compressing unit that sets an optimum compression ratio on the basis of the information to compress the image and stores the image in the image file storing unit.

Preferably, the environmental information includes apparatus information on the network itself, apparatus information on apparatuses connected to the network, and information on applications provided in the respective apparatuses. In addition, the operation information includes information on users of the image display terminals and information on operation that is applied to images displayed on the image display terminals by the users and affects a quality of the image.

Next, in order to solve the problems, the image file compressing unit applies at least one compression form to identical images to generate plural compressed images with different compression ratios and stores the compressed images in the image file storing unit.

Further, in order to solve the problems, the image display terminals include an input unit that receives designation of information on compression of an image, the image file compressing unit generates an image with a compression ratio received by the input unit and transmits the image to the image display terminals, and, when a compression ratio is not designated by the input unit, the image file compressing unit transmits a compressed image with a highest compression ratio to the image display terminals.

Preferably, in order to receive designation of a compression ratio, the image file compressing unit generates images, for which at least one of a compression ratio and a compression method is different, from one image. Then, after dividing these images into identical plural parts, the image file compressing unit selects different parts from the respective images and combines the parts into one new image constituting substantially the entire original image and transmits the composite image to the image display terminals. The image display terminals display these plural partial images. This composite image may be one new image in which identical parts of the respective images are arranged in parallel.

Preferably, the image display terminals can receive designation of positions and sizes of the partial images via the input unit. The image display terminals can display the compression ratios of the respective images in at least one of character strings or bar graphs together with the displayed images with the different compression ratios. Alternatively, the image display terminals can display at least one of characters indicating the compression methods of the respective images, sizes of the compressed images, and parameters affecting qualities of the images together with the displayed images for which the compression method is different.

Moreover, in order to solve the problems, the image storage server includes a control unit that stores a storage history of image information of the image file storing unit. The control unit calculates a period in which there is no free space in the image file storing unit on the basis of the stored storage history.

Preferably, the control unit monitors a history concerning operation for image compression ratios in the image display terminals. After elapse of the period calculated by the control unit or a period that does not exceed the period and is set in advance, the control unit sets an optimum compression ratio on the basis of obtained information. Then, the control unit selects an optimum compression form to compress an image and store the image in the image storing unit. Alternatively, the control unit monitors histories concerning operation for image compression ratios in the image display terminals. When the period, which does not exceed the period calculated by the control unit and is set in advance, elapses, the control unit sets an optimum compression ratio on the basis of obtained information. Then, the control unit selects an optimum compression form to compress an image and store the image in the image storing unit and, at the same time, deletes other compressed image data and original image data from the image file storing unit.

Preferably, the image file compressing unit monitors histories concerning operation for image compression ratios in the image display terminals during a period that does not exceed the period calculated by the control unit and is set in advance. Every time when new information on a compression ratio is obtained, the image file compressing unit resets an optimum compression ratio and reselects an optimum compression form to compress and store the image in the image file storing unit. In addition, after the set period elapses, the image file compressing unit deletes other compressed image data and original image data from the image file storing unit.

Furthermore, in order to solve the problems, the histories concerning operation for image compression ratios in the image display terminals include a compression form that respective terminals can cope with.

Moreover, in order to solve the problems, the image file compressing unit monitors the histories concerning image compression ratios in the image display terminals even after elapse of the period that does not exceed the period calculated by the control unit and is set in advance.

Furthermore, in order solve the problems, on the basis of information on the respective terminals obtained from the information managing unit, the image storage server judges whether a program for image display is transmitted to the respective terminals to cause the terminals to execute the program or only a program for image display executed in the image storage server is transmitted.

Moreover, in order to solve the problems, the image file compressing unit selects a history concerning operation for an image compression ratio in the image display terminals from the information acquired by the information managing unit and monitors the history.

Furthermore, in order to solve the problems, while displaying medical images in the image display terminals, the image storage server is connected, via a network, to a diagnostic reading support system on the outside that creates a diagnostic reading report in a diagnostic reading report terminal and at least the diagnostic reading support system refers to the medical images or the diagnostic reading report is referred to by the image storage server. The diagnostic reading support system acquires information on required image compression on the basis of a table set in advance, creates a diagnostic reading report attached with a reference screen using an image based on the information, and returns the diagnostic reading report to the image storage server.

Moreover, in order to solve the problems, the information managing unit acquires information on specifications of the image display terminals and information on applications running on the image display terminals as environmental information of the system and acquires operation history information concerning image qualities in the image display terminals. The image file compressing unit selects candidate compression ratios on the basis of the specification information, the application information, and the operation history information and transmits the selected candidate compression ratios to the image display terminals. The image display terminals have setting devices that display the candidate compression ratios and set a desired compression ratio among the candidate compression ratios. The image file compressing unit compresses the image in accordance with the compression ratio set by the setting device.

Preferably, the image file compressing unit can be adapted to select different plural candidate compression ratios and compress an image at the plural compression ratios to store the compressed images in the image file storing unit.

The image file compressing unit may transmit a signal for requesting confirmation on whether image compression may be started to the image display terminals before starting the image compression. Alternatively, the image file compressing unit may transmit a signal for requesting designation of a desired compression ratio and compress an image at a designated compression ratio. It is also possible not to apply a compression ratio, which is set on the basis of information on compression of the image, to a specified image.

In order to solve the problems, an image storage and display method according to the invention includes: an image file storing step of causing an image storage server to store image data; and an image display step of causing image display terminals to acquire an image, which is stored in the image file storing step, via a network and display the image. In the image storage and display method, the image file storing step includes: an information managing step of acquiring and managing information on a system including at least one of environmental information and operation information of a system for realizing the image storage and display method; and an image file compressing step of setting an optimum compression ratio on the basis of the information to compress and store the image.

Preferably, in the information managing step, information on specifications of the image display terminals and information on applications running on the image display terminals may be acquired as environmental information of the system and operation history information concerning image qualities in the image display terminals may be acquired as the operation information. In the image file compressing step, candidate compression ratios may be selected on the basis of the specification information, the application information, and the operation history information and the selected candidate compression ratios may be transmitted to the image display terminals. In the image displaying step, the image display terminals may be caused to display the candidate compression ratios to set a desired compression ratio among the candidate compression ratios. In the image file compressing step, the image may be compressed in accordance with the compression ratio set according to the setting above.

In order to solve the problems, a maintenance system according to the invention is a maintenance system for performing maintenance for an image storage and display system with remote control, including: an image storage server that includes an image file storing unit for storing image data; and image display terminals that are connected to the image storage server via a network and display an image sent from the image storage server. In the image storage and display system, the image storage server includes: an information managing unit that acquires and manages information on a system including environmental information and operation information of the system; and an image file compressing unit that sets an optimum compression ratio on the basis of the information to compress the image and stores the image in the image file storing unit. The maintenance system acquires information on required image compression from the image storage and display system on the basis of a table set in advance and, after analyzing the information, sets the information in the image storage and display system as updated information.

BRIEF DESCRIPTION OF THE DRAWINGS

In the accompanying drawings:

FIG. 2 is a diagram showing a schematic structure of a client viewer shown in FIG. 1;

FIG. 3 is a diagram showing an example of an operation history file;

FIGS. 8A and 8B are diagrams showing examples of an image displayed on a display for selection of an image compression ratio, wherein FIG. 8A is a diagram in which respective parts of the image are displayed at different compression ratios and FIG. 8B is a diagram in which an identical part of the image is displayed at different compression ratios;

FIGS. 9A and 9B are diagrams showing examples of an image displayed on a display for selection of an image compression method, wherein FIG. 9A is a diagram in which compression methods and compression parameters are displayed and FIG. 9B is a diagram in which file sizes are displayed;

FIGS. 10A and 10B are diagrams showing examples of compression ratio information stored as a data table;

FIG. 16 is a flowchart for explaining a flow of processing of a maintenance terminal.

DETAILED DESCRIPTION OF THE PREFERRED EMBODIMENTS

Figure 1:
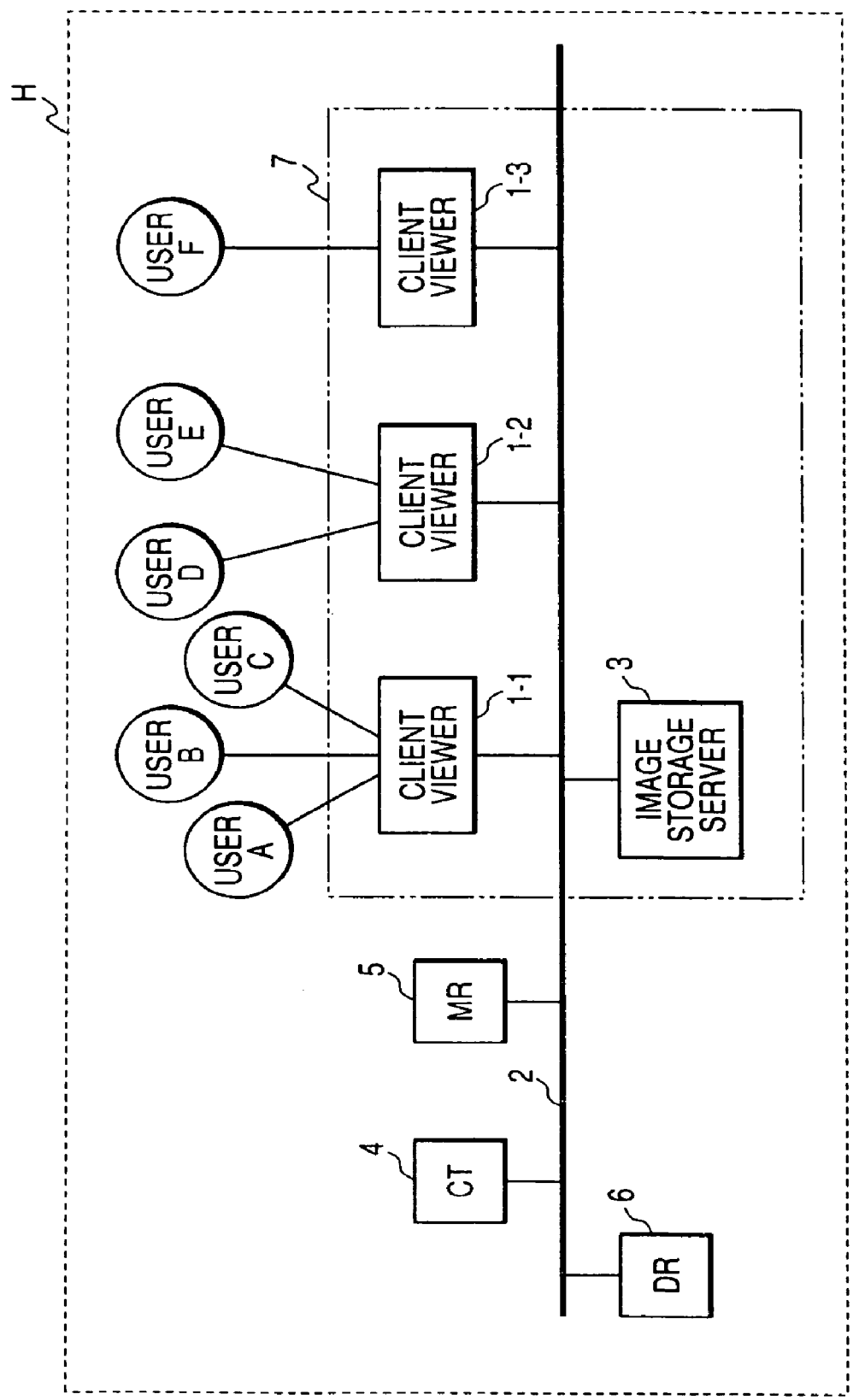
FIG. 1 is a diagram schematically showing a first embodiment of an image storage and display system according to the invention.

An image storage and display system according to a first embodiment of the invention will be explained with reference to the accompanying drawings. FIG. 1 schematically shows an entire image storage and display system 7 according to the first embodiment.

Client viewers 1 are installed in a medical facility site H. Only a single client viewer 1 may be installed in one medical facility H or plural client viewers 1-1, 1-2, 1-3, and the like may be installed as shown in the figure. For example, one client viewer 1-1 may be used by plural users A, B, C, and the like.

A local area network 2 is provided in the medical facility H. The client viewers 1 constitute a local area network (LAN) in conjunction with an image storage server 3, an X-ray computed tomographic (CT) apparatus 4, a magnetic resonance imaging (MR) apparatus 5, a digital radiography (DR) apparatus 6, and the like. Image files imaged by medical image generating apparatuses such as the CT apparatus 4, the MR apparatus 5, and the DR apparatus 6 are stored in the image storage server 3. The stored image files are supplied from the image storage server 3 to the client viewers 1 in response to requests from the client viewers 1.

Therefore, an image supplied to the client viewers 1 may be an image imaged by the CT 4 or may be an image imaged by the MR 5. Note that the client viewers 1, the local area network 2, and the image storage server 3 according to this embodiment constitute a main part of the image storage and display system 7 according to the invention.

As shown in FIG. 2, the client viewer 1 includes a display 21, an operation input unit 22, an operation history file generating unit 23, an operation history file storing unit 24, a GUI control unit 25, and a communication device 28 as main components of the client viewer 1.

A graphical user interface (GUI) of a system for operating and inputting graphical elements such as icons and buttons using a pointing device (the operation input unit) 22 is displayed on the display 21 together with an image that are loaded for the purpose of diagnostic reading and the like from the image storage server 3 under control of the GUI control unit 25. The graphical elements are associated with instructions concerning image display and processing such as the number of frames of an image and image processing. An instruction, which is inputted by operation such as click of buttons via this GUI, is recognized by the GUI control unit 25 and notified to an instruction executing unit of a not-shown display control apparatus, a not-shown image processing apparatus, or the like corresponding to the instruction. In addition, the operation history file generating unit 23 generates an operation history file in accordance with a history of input operation for instructions performed via the GUI. The so generated operation history file is stored in the operation history file storing unit 24.

As shown in FIG. 3, information on operation affecting a quality of an image, which is applied to a displayed image by a user, is written in the operation history file together with a type of an instruction, a type of operation (click, drag, etc.), date and time when operation is performed. The information includes operation such as button click for magnification and reduction of the displayed image, change of a compression ratio of the displayed image, movement of the displayed image, a request for acquisition of an original image (whether a higher quality image is requested), a history thereof, the number of times, and the like. In addition to compressed image data, information on operation by a user of the client viewer 1 (information on who performed diagnostic reading with which terminal, how, and when), automatic compression ratio change information, and the like are stored in the operation history file. Moreover, information for collective management of users logging in the client viewer 1, inspection related information, order information, report information, and the like are also stored in the operation history file.

The communication device 28 transmits operation history files, which has not been transmitted, stored in the operation history file storing unit 24 to the image storage server 3 in response to an operation history file transmission request sent from the image storage server 3 through the local area network 2, periodically, or at the time of login (at the time of system startup).

A workstation or the like is usually adopted as this client viewer 1. However, a Personal Digital Assistance (PDA) may be used. Therefore, a resolution of the display 21 may be different depending on a model of the client viewer 1. In addition, since a capacity of an auxiliary storage such as a hard disk or a memory is different depending on the model, an executable program may be different.

Figure 4:
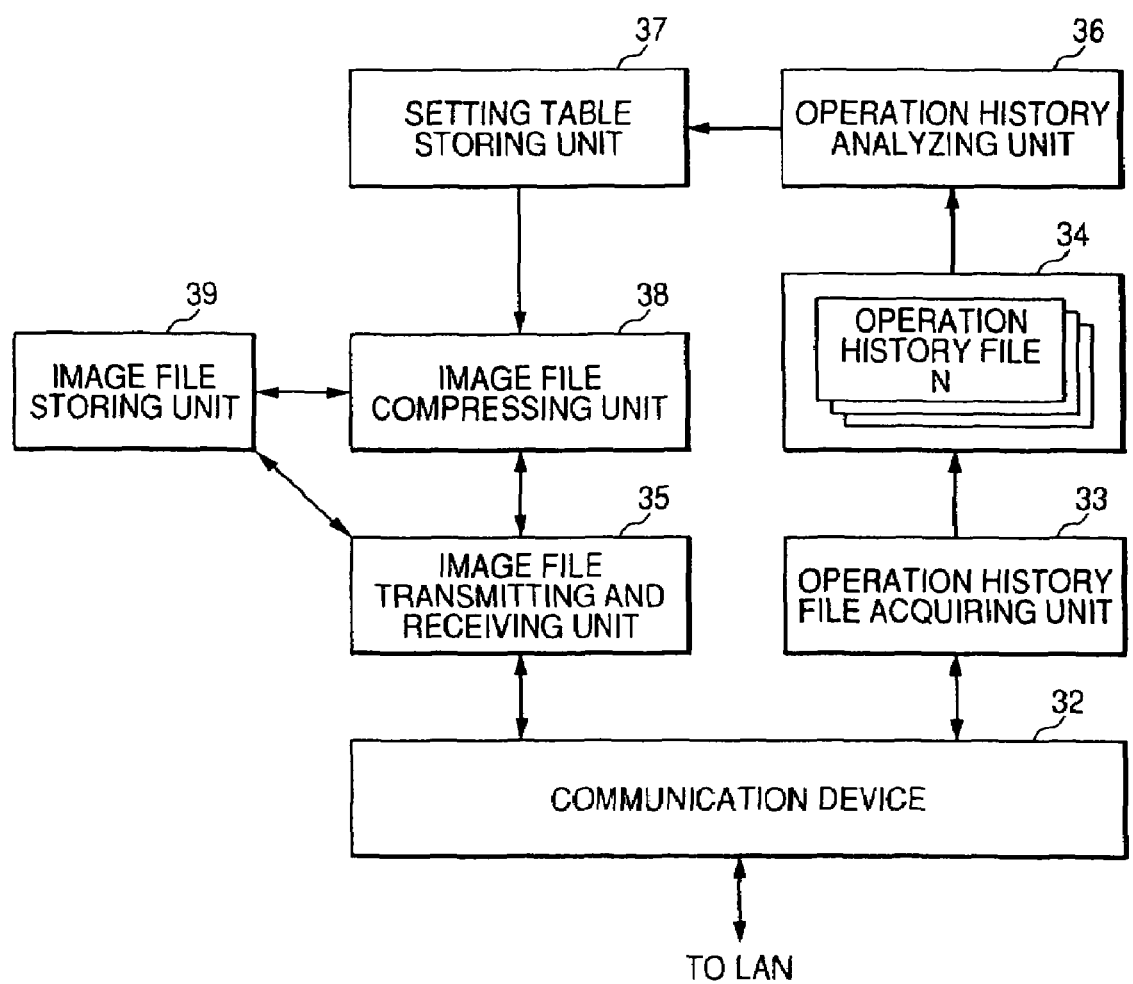
FIG. 4 is a diagram showing a schematic structure of an image storage server shown in FIG. 1.

As shown in FIG. 4, the image storage server 3 includes a communication device 32, an operation history file acquiring unit 33, an operation history file storing unit 34, an operation history analyzing unit 36 a setting table storing unit 37, an image file transmitting and receiving unit 35, an image file compressing unit 38, and an image file storing unit 39 as main components of the image storage server 3.

The operation history file acquiring unit 33 transmits an operation history file transmission request to the client viewers 1 via the communication device 32 periodically. In addition, the operation history file acquiring unit 33 stores operation history files transmitted from the client viewers 1 in the operation history file storing unit 34 in association with viewer identification numbers.

Information to be stored in the operation history file storing unit 34 includes, in addition to the operation history information, apparatus information, network apparatus information, application information, and the like. Here, the apparatus information means specifications of a CPU, a quantity of installed memories, a resolution of a monitor, graphic board information (including driver information such as a version), location information of the client viewers 1 (an address of a hospital, a name of a room, a name of a client viewer, a position in a room were the client viewer is installed), information with which a client viewer can be specified (a model, a CPU serial number, a MAC address, an IP address), and the like.

A reason for also storing the apparatus information and the like in the operation history file storing unit 34 in this way is as described below. For example, when an image quality (resolution) is low, even if a compression ratio of an image is increased and the image quality is deteriorated, it is not so difficult to look at the image. However, in a client viewer with a high image quality (high resolution) it is difficult to identify an image with a high compression ratio. Like these cases, determination of a compression ratio of an image is affected by the image quality. In addition, when performance of a CPU is low or a quantity of memories is small, since particularly long time is required to display an image with a low compression ratio, display speed is given priority at the sacrifice of an image quality to some extent. Note that these pieces of information are desirably set before the image storage and display system 7 is shipped.

The network apparatus information includes network configuration information (an IP address and a layout of a hub, a rooter, a network cable, a firewall, an external line, and the like) in an entire system of a medical facility (including the inside and the outside of the medical facility), information on network speed between a server and a client at certain time (Ping, etc. that can estimate network speed from the network configuration information and in which actual speed can be found by measurement), and the like. This is because performance of the network also affects the time required for image display.

The application information is information related to versions of application programs of the image storage server 3 and the respective client viewers 1 in use, conditions of use of the programs, data sizes of the programs, image qualities, and speed (e.g., selectable compression methods such as JPEG, Wavelet, and JPEG2000 and compression ratios of the image storage server 3 and the respective client viewers 1). For example, when an image is displayed three-dimensionally, an application program of this type usually requires a large quantity of memories and a graphic board capable of performing high-speed processing. Thus, this application program is transmitted to the client viewer 1 having a free space in a memory from the image storage server 3 to execute the application program on the client viewer 1. Consequently, it is possible to reduce a burden on the image storage server 3. On the other hand, in the client viewer 1 inferior in the quantity of memories and the processing speed, application information is required to execute the application program on the image storage server 3 side and perform judgment for transmitting only a three-dimensional image, which is a result of the execution of the application program, to the client viewer 1 side.

The pieces of information described above are combined to store certain plural automatic compression methods and compression ratio changing conditions and date and time of application of the conditions are also stored as information. For example, it is determined not only from the application information but also from combination of performance of a CPU, the number of memories, and the like whether the application program is executed on the image storage server 3 or executed on the client viewers 1 side. Note that, in this explanation, it is assumed that information on these devices, information on the network, and the like are also included in the operation history file in addition to information on operation by a user.

The operation history analyzing unit 36 analyzes operation related to a quality of an image in operation of the user performed in an automatically calculated certain period, determines a compression ratio, which is considered to be an optimum compression ratio, for each user, modality, and region, and stores information of the compression ratio in the setting table storing unit 37.

The image file transmitting and receiving unit 35 receives images imaged by the respective modalities via the communication device 32 according to control of a not-shown control unit. In addition, the image file transmitting and receiving unit 35 transmits an image stored in the image file storing unit 39 in response to requests of the client viewers 1.

The image file compressing unit 38 compresses the image stored in the image file storing unit 39 in accordance with the compression ratio, which is set according to the analysis of the operation history analyzing unit 36 and stored in the setting table storing unit 37, and stores the image in place of an original image or in addition to the original image.

Note that the client viewers 1 according to this embodiment constitute an image display terminal in the invention. The operation history file acquiring unit 33, the operation history file storing unit 34, and the operation history analyzing unit 36 according to this embodiment constitute a main part of an information managing unit in the invention.

The image storage and display system 7 according to the embodiment is constituted as described above. An operation of the image storage and display system 7 will be hereinafter explained.

Figure 5:
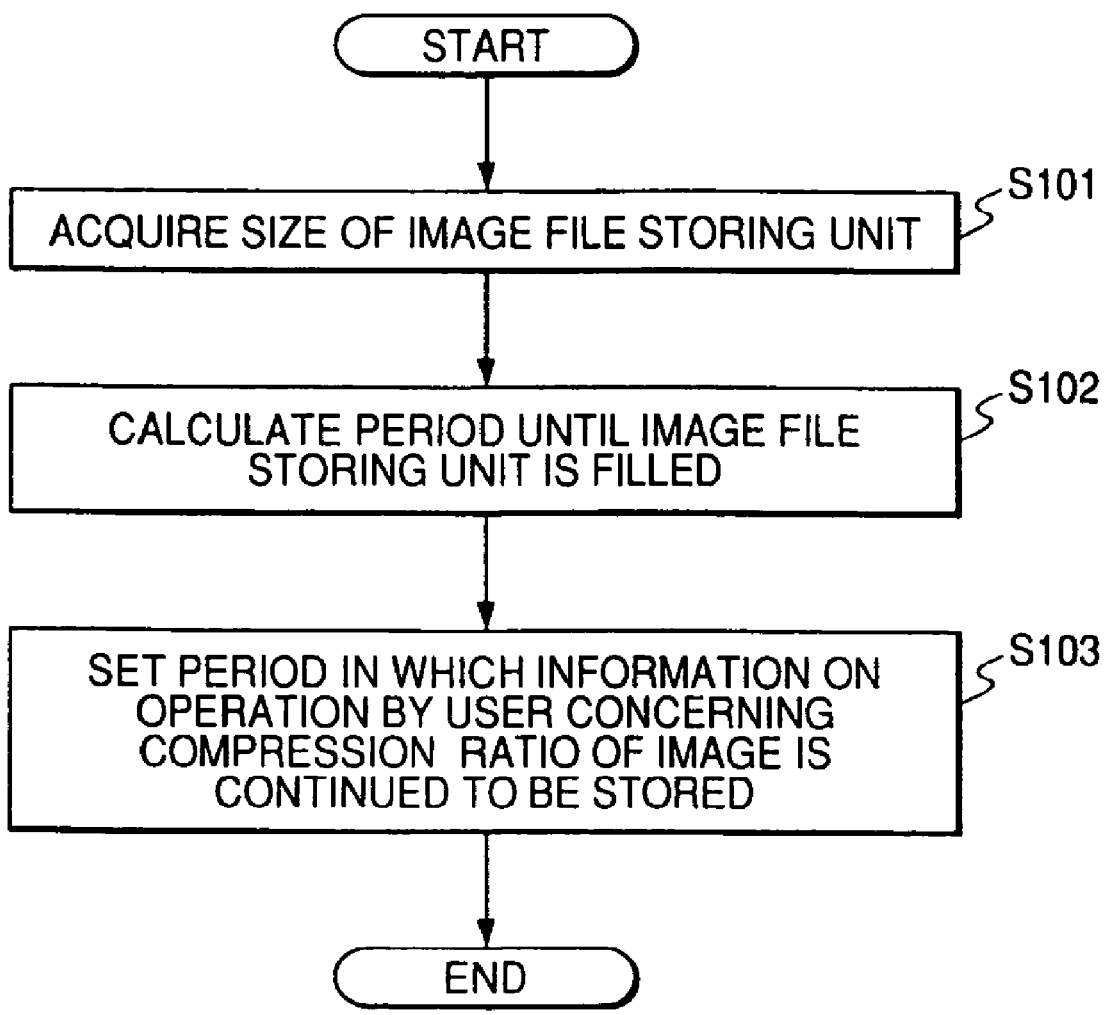
FIG. 5 is a flowchart for explaining a flow of processing for setting an analysis period for operation information.

When system operation is started, first, the image storage and display system 7 automatically determines an analysis period for information on operation by a user. A flow of this processing will be explained with reference to a flowchart shown in FIG. 5. First, the not-shown control unit of the image storing server 3 acquires a size, that is, an image file storing capacity of the image file storing unit 39 (step S101).

Thereafter, the control unit monitors the image file storing unit 39 and calculates a period until a capacity of the image file storing unit 39 is filled with original medical images including compressed images that can be restored to an original image (step S102). As a method for the calculation, a value derived by a person based on daily operational experiences, a value of a size of all images sent in one day, or a value of images accumulated, for example, in one week is calculated every week and an image storage limit capacity is divided by the calculated value to determine the period. When the storage limit capacity of the image is changed, the calculation is repeated.

Subsequently, the control unit sets a period, in which information on operation by the user concerning a compression ratio of an image is continuously stored, relatively to the period until the capacity of the image file storing unit 39 obtained in this way is filled (step S103). For example, when the period is calculated as one month from an amount of increase of image files in one day in step S102, the control unit sets an operation information storing period to a first one week of the month.

Until this monitoring period ends, in principle, the image storage and display system 7 stores an uncompressed original or a compressed image restorable to an original image and several kinds of images compressed at different compression ratios or at least one kind of an image (e.g., JPEG2K is one kind of reversible data but can be replaced with several kinds of irreversible data) in the image file storing unit 39.

Figure 6:
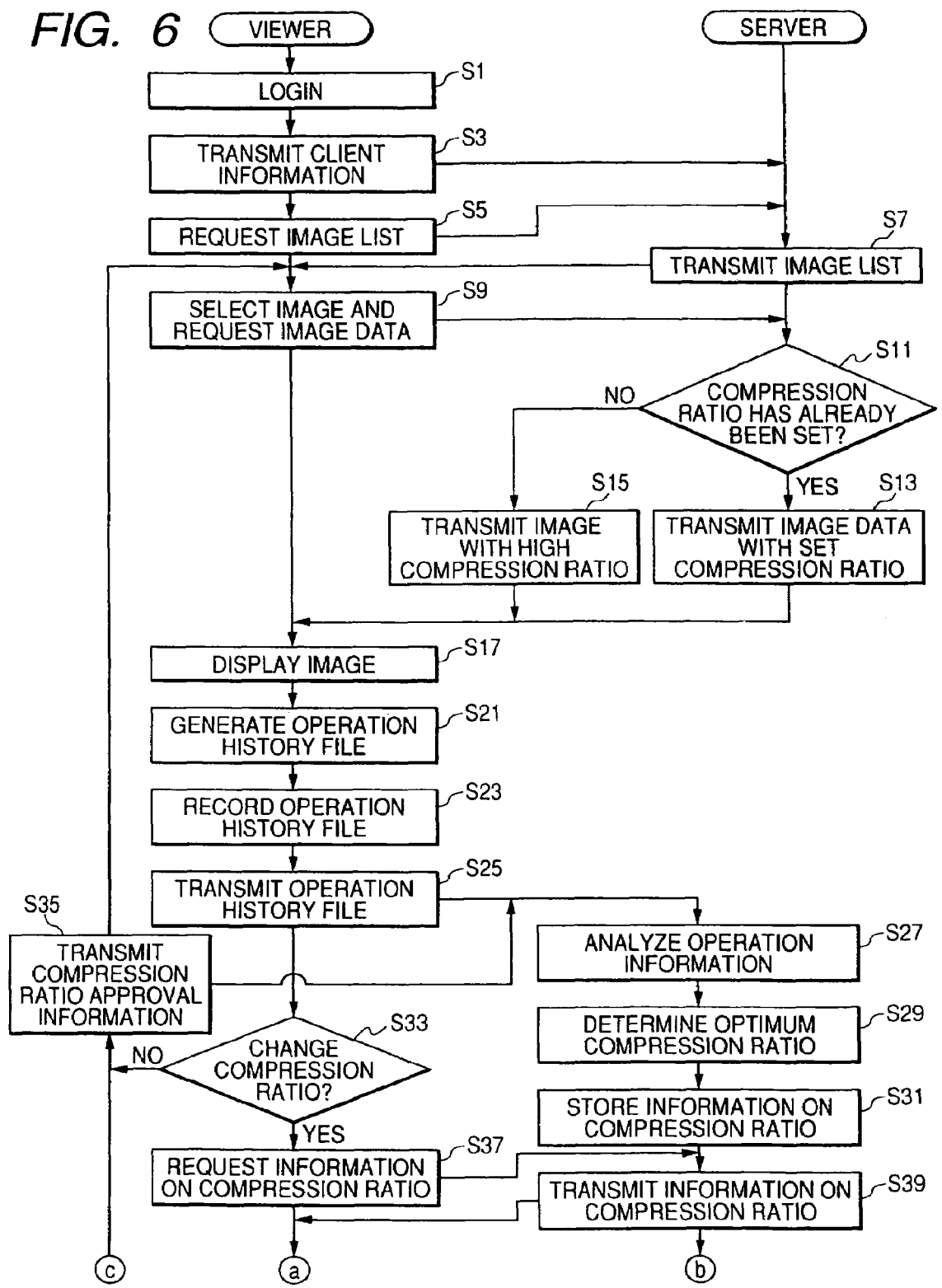
FIG. 6 is a sequence diagram (former half) showing an example of a flow of processing and signals of a client viewer and an image storage server according to a first embodiment of the invention.
Figure 7:
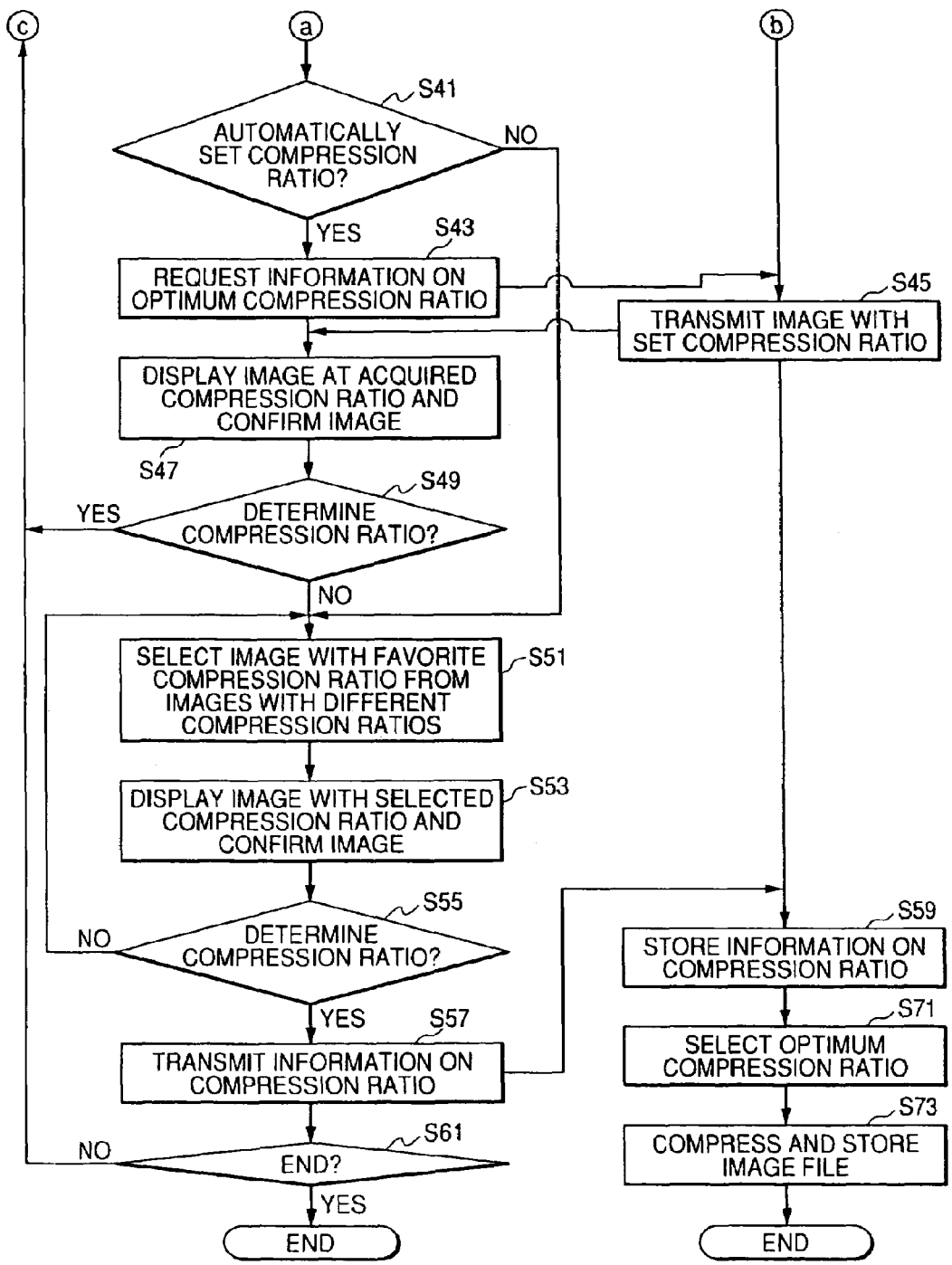
FIG. 7 is a sequence diagram (latter half) showing the example of a flow of processing and signals of the client viewer and the image storage server.

Operations of the client viewers 1 and the image storage server 3 during this monitoring period will be explained. First, assuming that a user A uses, for example, the client viewer 1-1 in the plural client viewers 1 shown in FIG. 1, FIGS. 6 and 7 show sequence diagrams showing a flow of processing and signals of the client viewer 1-1 and the image storing server 3.

First, the user A turns on a power supply to start the client viewer 1-1 and inputs a password and the like to log in the local area network 2 (step S1). Consequently, information specifying the user A and a terminal in use is transmitted to the image storage server 3 (step S3).

Next, the user A operates the operation input unit 22 of the client viewer 1-1 to request the image storage server 3 to transmit a list of images stored in the image file storing unit 39 to the user A in order to invoke a required image (step S5). The image storage server 3, which has received this request, transmits the image list to the user A (step S7).

This list is displayed on the display 21 of the client viewer 1-1. The user A selects a desired image out of this list and requests the image storage server 3 to transmit the image to the user A (step S9).

If a compression ratio has already been set for the requested image ("Yes" in step S11), the image storage server 3 transmits image data with the set compression ratio to the client viewer 1-1 (step S13). If a compression ratio has not been set for the requested image ("No" in step S11), the image storage server 3 transmits an image having a highest compression ratio, that is, an image having a small image size and, therefore, inferior in an image quality among plural images with different compression ratios to the user A (step S15). Consequently, transmission time for the image is reduced and, in order to optimize a compression ratio, the user A is facilitated to change the compression ratio when it is difficult to see the image.

The image transmitted in this way is displayed on the display 21. The user A applies operation such as drag and drop to the image via the mouse or the like of the input operation unit 22 such that the image changes to an image easy to see for the user A (step S17).

When operation is performed on the GUI via the operation input unit 22, the GUI control unit 25 detects the operation and the operation history file generating unit 23 generates the operation history file shown in FIG. 3 (step S21) and stores the generated operation history file in the operation history file storing unit 24 (step S23). Then, the communication device 28 reads out one or plural operation history files, which has not been transmitted, from the operation history file storing unit 24 and transmits the operation history files to the image storage server 3 (step S25). The generation and recording of the operation history file is performed not only in this steps but also every time when the user A performs operation for a compression ratio of an image.

The operation history file acquiring unit 33 acquires this operation history file via the communication device 32 and temporarily stores it in the operation history file storing unit 34. Then, the operation history file is sent to the history analyzing unit 36 and analyzed (step S27). A compression ratio, which is considered to be an optimum compression ratio, is determined for each user, modality, and region (step S29) and information on the compression ratio is stored in the setting table storing unit (step S31).

On the other hand, in the client viewer 1-1, if the user A is not dissatisfied with a resolution of the displayed image ("No" in step S33), the user A returns to step S9 by, for example, clicking a button on the display 22 in order to display a new image. According to this operation, the operation history file generating unit 23 considers that the user A is satisfied with the present compression ratio and transmits compression ratio approval information to the image storage server 3 (step S35).

Conversely, if the user A is dissatisfied with a quality of the displayed image ("Yes" in step S33), in order to display an image with a higher quality, the client viewer 1-1 requests the image storage server 3 to transmit information on a compression ratio of the image to the client viewer 1-1 (step S37).

In response to this request, the image storage server 3 transmits information on a compression ratio that has already been set and, if possible, a compression ratio that can be generated from an original image file to the client viewer 1-1 (step S39). This information is displayed on the display 22 of the client viewer 1-1 as a composite image of plural kinds (two or more kinds) of images for which a compression ratio and a compression method are different.

Figure 8A:
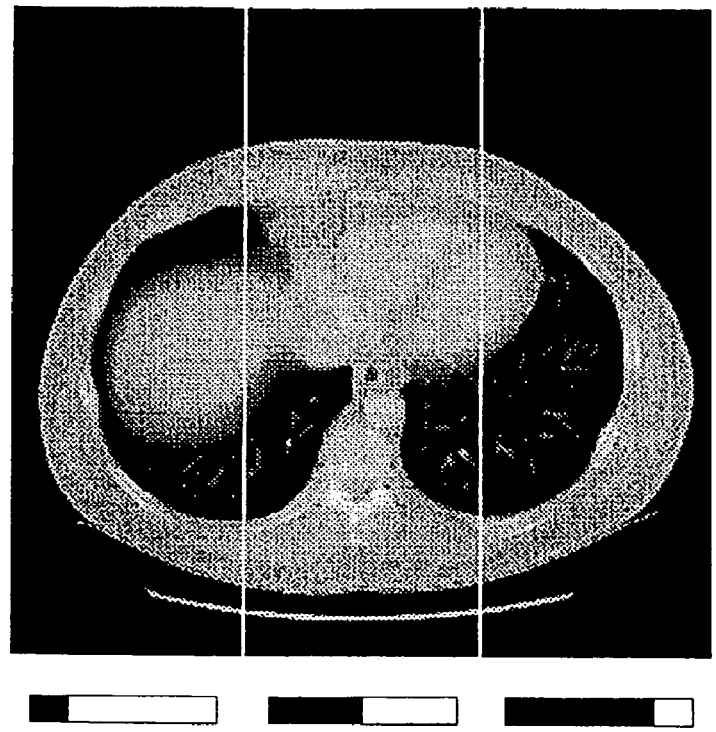

For example, as shown in FIG. 8A, first, plural images, for which at least one of a compression ratio and a compression method is different, are generated from one image by the image file compressing unit 38. After these images are divided into plural identical parts, different parts are selected from the respective images and formed as one new image forming substantially the entire original image. In this way, the composite image is formed. Different compression ratios of the respective parts of this image are clearly indicated by bar graphs shown below the image.

Figure 8B:
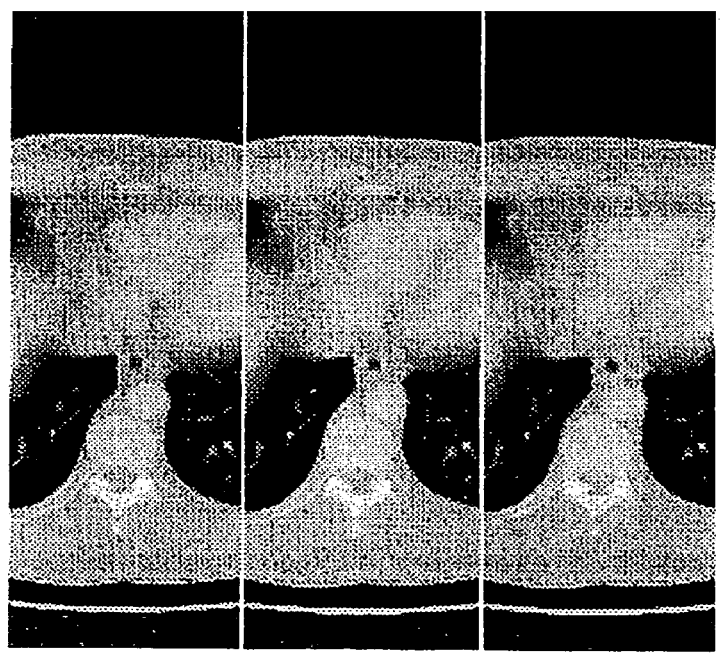

As shown in FIG. 8B, first, plural images, for which at least one of a compression ratio and a compression method is different, are generated from one image by the image file compressing unit 38. After these images are divided into plural identical parts, it is possible to form one new image in which identical parts of the respective images (in the figure, an image in the center of three images equally divided vertically) are arranged in parallel. In this way, the composite image is formed. In addition, as shown in the figure, different compression rates of the respective parts of the image may be indicated by character strings or both character strings and bar graphs.

This image selection can be performed by designating a compression method other than designating a compression ratio. Examples of this compression method include JPEG, PNG, JPEG2000, wavelet, gif, Tiff, and bmp. If the image selection is performed by designating a compression method in this way, it is possible to avoid designation of a compression method that some client viewers 1 cannot select or a compression method that is not an optimum compression method.

When a type of an image is selected by designating a compression method, characters indicating the compression method are displayed together with images on a display 22 of the client viewer 1-1. In an example shown in FIG. 9A, in addition to compression methods, parameters peculiar to the compression methods (e.g., Q=20 in the case of JPEG, rate=10% in the case of JPEG2000, etc.) are also displayed. Alternatively, as shown in FIG. 9B, sizes of compressed images may be displayed together with images.

Figure 9A:
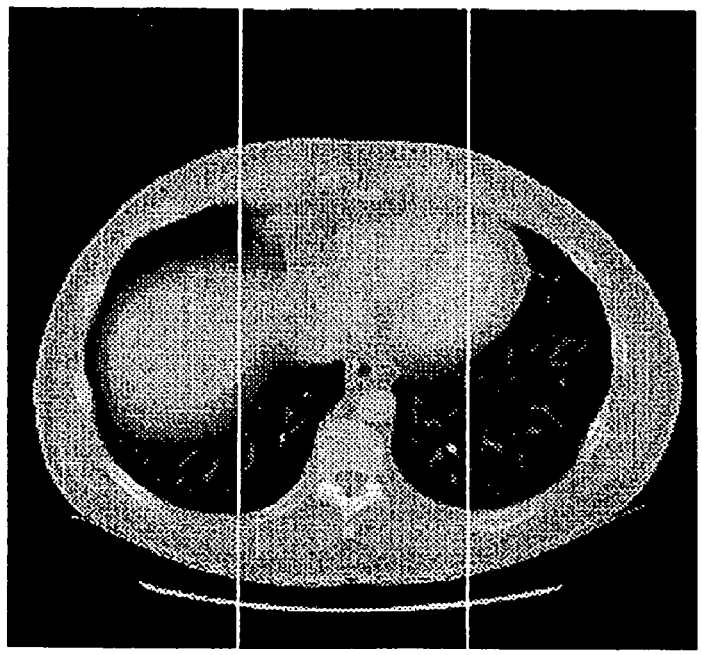
Figure 9B:
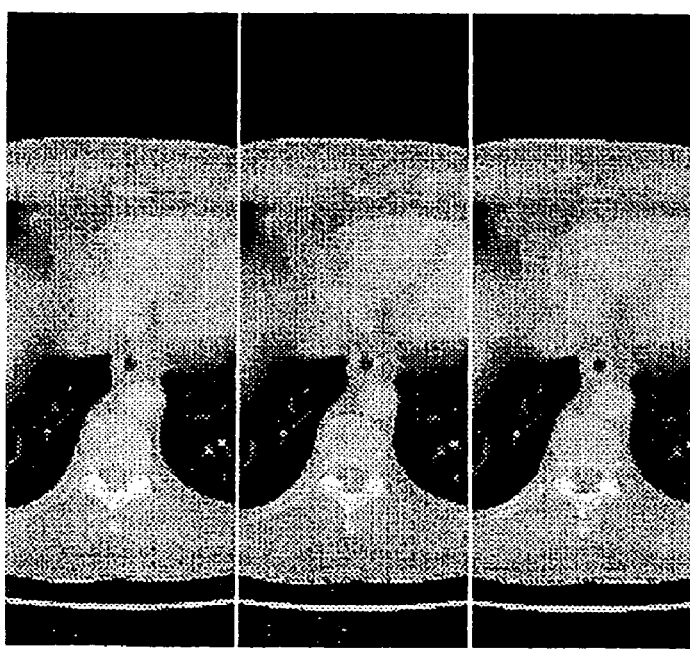

In FIG. 9A, a composite image forming substantially an entire original image is displayed as an example as in FIG. 8A. In FIG. 9B, a composite image, in which identical parts of an original image are arranged in parallel, is displayed as an example as in FIG. 8B. However, it is needless to mention that they may be displayed using the other composite images, respectively.

If compression ratios or the like are simply compared, it is also possible that plural images, for which at least one of a compression ratio and a compression method is different, are generated from one image and the plural images are reduced in size to display all the images side by side. Moreover, in divided display of an image, it is also possible to adopt a method of dividing an image vertically and arranging the divided images vertically other than a method of dividing an image horizontally and arranging the divided images horizontally.

If the user A desires to automatically set an optimum compression ratio among the displayed plural compression ratios ("Yes" in step S41), the user A requests the image storage server 3 to transmit an image with the optimum compression ratio (step S43). The image storage server 3, which has received the request, transmits the information on the optimum compression ratio, which is stored in the setting table storing unit 37 in step S31, to the image file transmitting and receiving unit 35. The image file transmitting and receiving unit 35 acquires an image with this compression ratio from the image file storing unit 39 and transmits the image to the client viewer 1-1 (step S45).

When the user A looks at this image displayed on the display 22 (step S47) and is satisfied with this compression ratio ("Yes" in step S49), the user A returns to step S9 by, for example, clicking the button on the display 22 in order to display a new image. With this operation, the operation history file generating unit 23 considers that the user A is satisfied with the present compression ratio and transmits compression ratio approval information to the image storage server 3 (step S35).

If the user A is dissatisfied with this compression ratio ("No" in step S49) or if the user A does not desire the automatic setting of a compression ratio ("No" in step S41), the user A selects a favorite image out of the displayed several kinds of images with different compression ratios (step S51). Consequently, an image of a designated single compression ratio is displayed on the display 22. Thus, if the user A is satisfied with this compression ratio ("Yes" in step S55), information on this compression ratio is transmitted to the image storage server 3 (step S57) and stored (step S59).

When the user A wishes to display a new image, the user A returns to step S9 by, for example, clicking the button on the display 22. When the user A finishes looking at a desired image, the user A ends work by, for example, clicking an end button (step S61).

On the other hand, if the user A is dissatisfied with this compression ratio ("No" in step S55), the user A repeats steps S51 to S55 until an image with a satisfactory compression ratio is obtained.

The generation and the recording of the operation history file as described above are applied to all the users A, B, C, and the like and all the client viewers 1-1, 1-2, 1-3, and the like during a period set at first. For example, as shown in FIG.

10A, information on a compression ratio is stored as a data table. Concerning, for example, respective images, accumulated information on a compression ratio is classified for each of the client viewers 1-1, 1-2, 1-3, and the like. Moreover, the information on a compression ratio is classified for each of the users A, B, C, and the like. Information on a compression form of the image is also listed simultaneously with the information on a compression ratio.

As shown in FIG. 10B, this data table may be adapted to select an optimum compression ratio for each modality assuming that the data table is further classified for each modality. It is also possible to classify the data table for each application entity (AE) title of a DICOM, for each station name, or each image matrix.

For respective images, respective modalities, and the like, the image storage server 3 selects a compression ratio realizing a highest image quality as an optimum compression ratio out of compression ratios selected by the respective client viewers 1and the user (step S71). The compression ratio realizing a highest image quality is usually a minimum compression ratio, that is, a compression ratio realizing a largest file size. When there are plural compression methods even if a compression rate is the same, a compression method realizing a higher image quality is selected. If there is an image with the compression ratio or/and the compression method in the stored respective images, the image storage server 3 stores the image and, if there is no image with the compression ratio or/and the compression method, the image storage server 3 generates an image anew and stores the image (step S71). At this point, the original image and the images with other compression ratios are deleted.

When the compression ratio or/and the compression method for the image file are decided, this image file compression processing is automatically executed for image files accumulated anew every time when a predetermined period such as one day or one week elapses. As a result, only an image file with an optimum compression ratio is left in the image file storing unit 39. Consequently, the image file storing unit 39 is used most efficiently. In addition, the user is released from work for selecting an optimum resolution every time when an image is invoked.

Note that it is also possible to store compressed image data other than image data with an optimum compression ratio and original image data in the image file storing unit 39 for a fixed period without deleting the compressed image data and the original image data. Alternatively, the compressed image data and the original image data may be moved to a DVD or the like and, then, deleted.

In the example described above, the generation and the recording of an operation history file ends simultaneously with the end of the period set at first. However, it is also possible to continue this monitoring even after the end of the generation and the recording of an operation history file.

As described above, the image storage server 3 analyzes operation related to a quality of an image in operation of a user performed in a certain period that is automatically calculated, determines a compression ratio that is considered to be an optimum compression ratio, and stores information on the compression ratio. After the compression ratio, which is considered to be an optimum compression ratio, is determined once, the image storage server 3 displays an image on the basis of the information on the compression ratio. However, when the user is dissatisfied with a quality of the image and performs operation for changing the compression ratio, the image storage server 3 determines a compression ratio anew according to the operation. In this way, the image storage server 3 automatically sets an optimum compression ratio by analyzing operation of the user related to an image quality and feeding back a result of the analysis to change a compression ratio automatically.

Concerning a compression ratio designated by the user once or a compression ratio approved by the user and automatically calculated once, a history of the number of times of approval is stored for each user, each modality, and each region (the compression ratio designated by the user is hereinafter considered to be approved unless the compression ratio is changed). A compression ratio with a high frequency of use is considered to be a compression ratio with a high-priority and is often used. Consequently, it is possible to prevent images with various compression ratios from being present in the server more than necessary.

Figure 11:
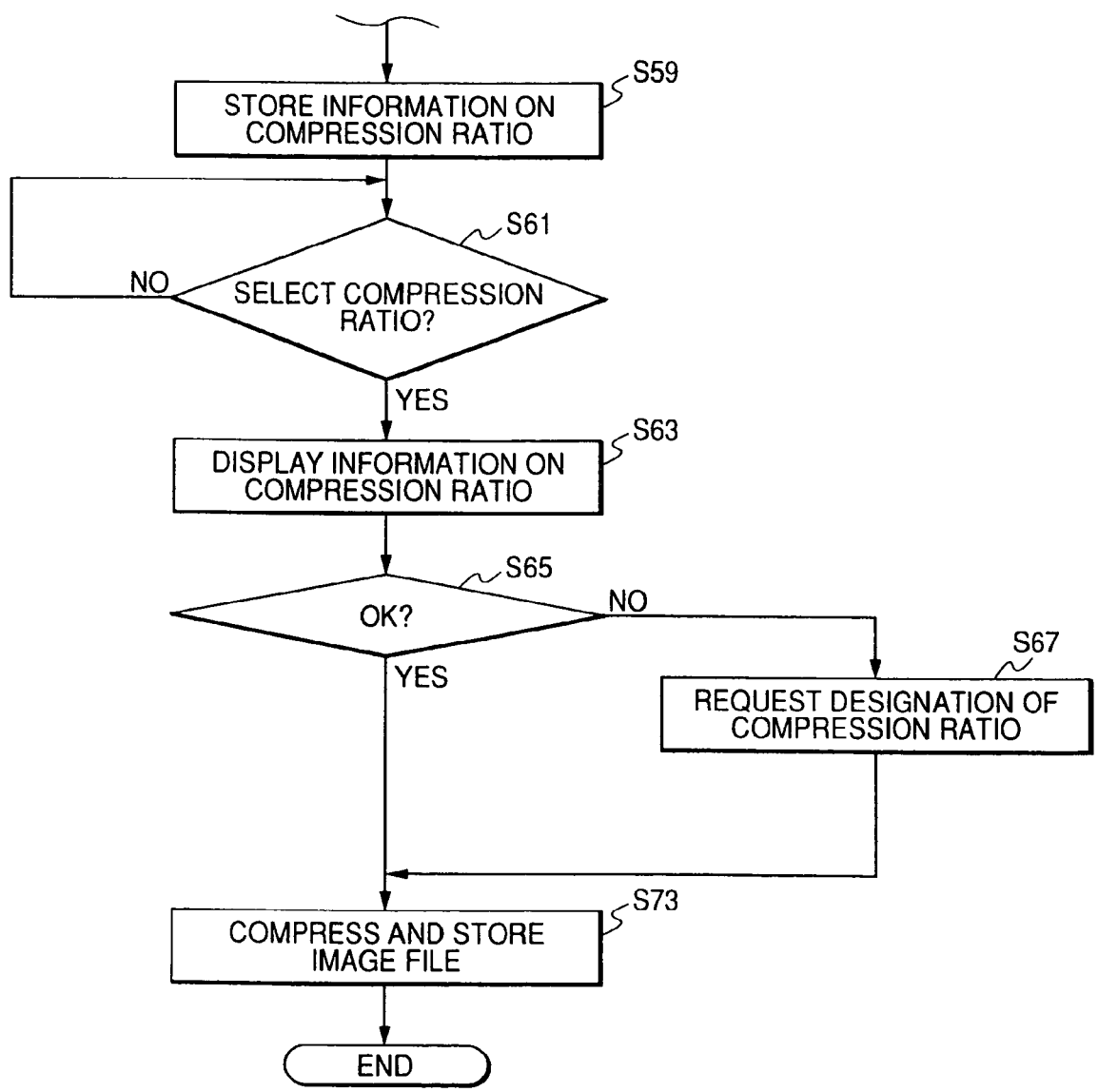
FIG. 11 is a partial sequence diagram showing a flow of processing and signals of a client viewer and an image storage server according to a first modification.

Next, a modification of the image display and storage system 7 according to this embodiment will be explained with reference to FIG. 11. FIG. 11 is a part of a sequence diagram showing a flow of processing and signals of the client viewer 1 and the image storage server 3 in the image display and storage system 7 according to this modification.

In the flow of processing and signals of the client viewer 1 and the image storage server 3, the image storage server 3 in the first embodiment compresses an image on the basis of information on a compression ratio accumulated after storing the information on a compression ratio (step S59). The image storage server 3 according to this modification is basically different in that, as shown in the figure, the image storage server 3 requests a system administrator to confirm a compression ratio. Since the other steps are substantially the same as those in the first embodiment, illustrations and explanations of the steps are omitted.

Even if a period set at first elapses, the image storage server 3 never automatically selects a compression ratio of an image and store a compressed image file but waits until the system administrator issues a command instructing selection of a compression ratio via an operation input unit (step S61). When such an instruction is issued, the image storage server 3 displays stored information on a compression ratio as shown in FIGS. 10A and 10B on a display unit of the image storage server 3 (step S63). At this point, a compression ratio to be adopted may be, for example, highlighted or displayed reversely to call the system administrator's attention.

Then, the image storage server 3 urges the system administrator to confirm whether the system administrator is satisfied with this compression ratio (step S65). If the system administrator is satisfied with the compression ratio, the image storage server 3 compresses an image and stores the image (step S73). If not, the image storage server 3 requests the system administrator to designate a compression ratio (step S67), compresses the image with a designated compression ratio, and stores the image. At this point, an original image and images with other compression ratios are deleted.

Consequently, the system administrator can confirm a compression ratio before an image file is compressed. Thus, it is possible to prevent the compression ratio from deviating from a value, which is usually assumed, because of abnormal operation or the like of the client viewer 1.

Figure 12:
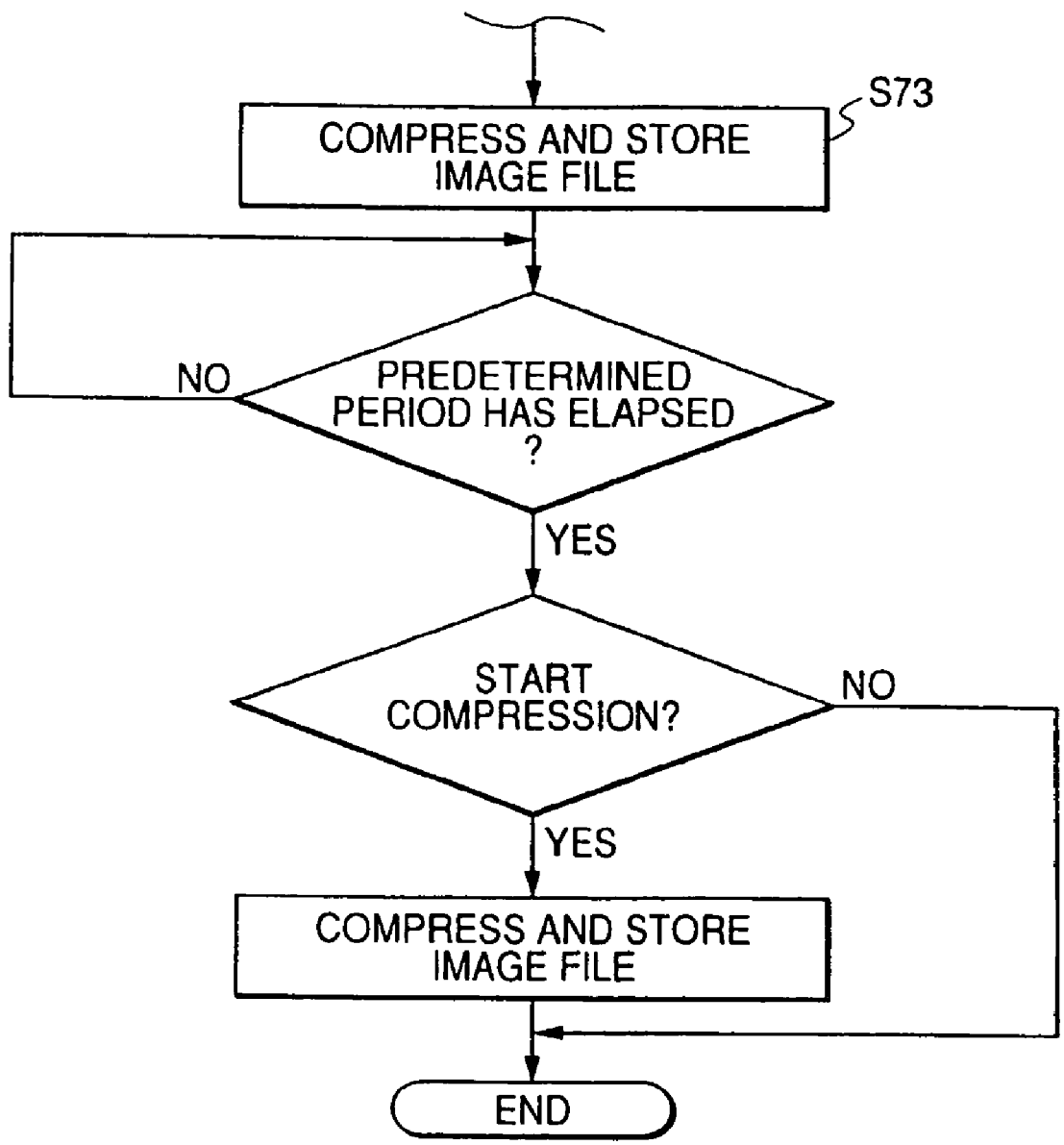
FIG. 12 is a partial sequence diagram showing a flow of processing and signals of a client viewer and an image storage server according to a second modification.

A second modification of the image display and storage system 7 according to this embodiment will be explained with reference to FIG. 12. FIG. 12 is a part of a sequence diagram showing a flow of processing and signals of the client viewer 1 and the image storage server 3 in the image display and storage system 7 according to this modification.

In the flow of processing and signals of the client viewer 1 and the image storage server 3, the image storage server 3 in the first embodiment automatically starts compression of image files accumulated anew in every predetermined period after storing information on a compression ratio (step S59) The image storage server 3 according to this modification is basically different in that the image storage server 3 requests a system administrator to confirm the storage ratio as shown in the figure. Since the other steps are substantially the same as those in the first embodiment, illustrations and explanations of the steps are omitted.

The image storage server 3 according to this modification inquires of the system administrator whether image files of images accumulated anew after elapse of a predetermined period should be compressed and stored after a compression ratio is decided (step S75). Here, when the system administrator issues a command instructing to start compression via an operation input unit, the image storage server 3 starts compression (step S77). Compression processing is not executed when the image storage server 3 instructs to stop the compression.

Consequently, before an image file is compressed, the system administrator can confirm whether the image file may be actually compressed. Thus, for example, in the case that a system configuration is changed and a compression ratio should also be changed, it is possible to prevent the image file from being compressed at a previous compression ratio carelessly.

As a further modification, naturally, it is also possible to combine the first and the second modifications. In the explanations of the first embodiment and the modification of the first embodiment, all image files are compressed. However, it is also possible to compress a part of the image files at different compression ratios or store a part of the image files without compressing the part of the image files.

For example, when an image of a specific case or an image considered to be important in researches is obtained, a user wishes to look at the image at as high resolution as possible and keep an original image even if a file size-increases slightly.

In such a case, the user checks a check box provided at a corner on the image via an operation input unit such as a mouse, whereby information, which indicates that compression is not allowed, is written in information incidental to the image and compression is prevented. Then, the image with this compression prevention information is excluded from objects of an operation history file.

Figure 13:
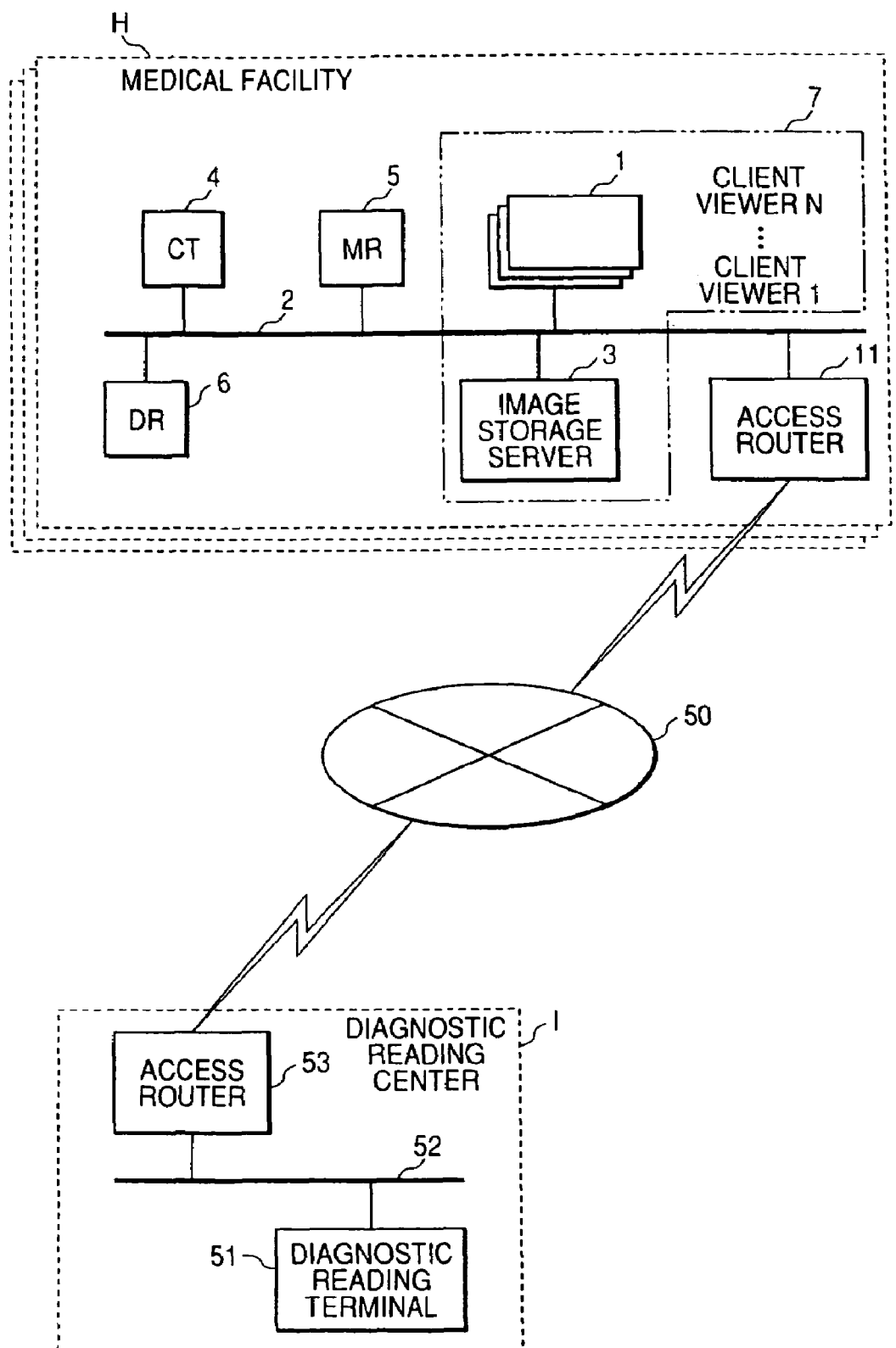
FIG. 13 is a diagram schematically showing an image storage and display system according to a second embodiment of the invention.

Next, an image storage and display system according to a second embodiment of the invention will be explained with reference to the drawings. As shown in FIG. 13, the image storage and display system according to this embodiment is different from that in the first embodiment in that plural medical facilities including an image storage and display system, which is the same as the image storage and display system 7 described above, are connected to a diagnostic reading center I on the outside via a public line 50. Other components of the image storage and display system are substantially the same as those in the first embodiment. Thus, the components are denoted by the same reference numerals and signs and explanations of the components are omitted.

Here, the "diagnostic reading center" means a facility that enters into contracts with medical facilities to offer a diagnostic reading support service with which a specialist diagnostically reads an image transmitted by a medical facility, which requests diagnostic reading, via a network. Note that, in this embodiment, in the explanation of this embodiment, the diagnostic reading center is given as an example. However, the image storage and display system may be connected to a facility that reports and evaluates an image transmitted from respective medical facilities via a public line or the like, for example, a meeting place of some medical society or other examination facilities.

Local area networks 2 in sites of the respective medical facilities H are connected to a local area network 52 in a site of the diagnostic reading center I from access routers 11 through the public line 50 or a wide area network of a private line. A local area network 52 is provided in the site of the diagnostic reading center I. An access router 53 and a diagnostic reading terminal 51 are connected through the local area network 52.

Figure 14:
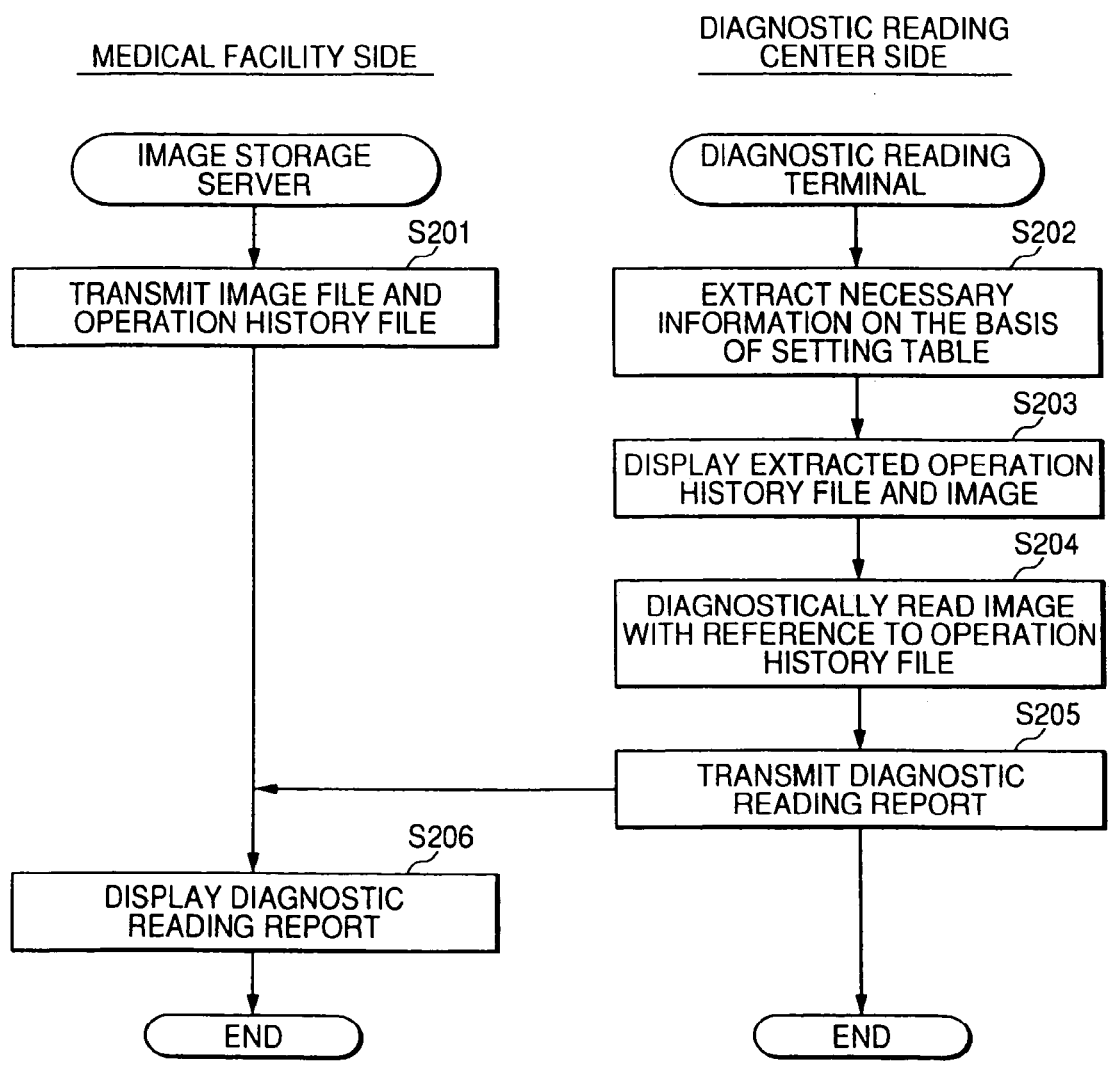
FIG. 14 is a diagram for explaining a processing sequence between an image storage server and a diagnostic reading terminal.

FIG. 14 is a schematic diagram for explaining a processing sequence between the image storage server 3 on the medical facility H side and the diagnostic reading terminal 51 on the diagnostic reading center I side. First, the image storage server 3 transmits an image file, for which diagnostic reading is requested, to the diagnostic reading terminal 51 together with an operation history file concerning an image of the image file (step S201).

In this case, since it is dangerous to transmit data revealing inside information of the medical facility H to the outside, the data is required to be converted and transmitted. Therefore, a list for identification, which associates data protected as data inaccessible from the outside and data converted for transmission to the outside of the data, is stored in the operation history file storing unit 34 as a secret information setting database. For example, a user A is converted into D1012065 and a user B is associated with D1020654. Only D1012065 and D1020654 are transmitted to the outside. On the other hand, when D1012065 and D1020654 are returned, it is possible to specify the users according to this secret information setting database.

On the other hand, some diagnostic reading centers can only cope with an image file compressed in a part of compression forms. In order to deal with such a case, for example, when the diagnostic reading center I copes with JPEG and does not cope with JPEG2000 and the medical facility transmits a CT image to the diagnostic reading center I, the image storage server 3 is set to always compress the CT image in the JPEG format. Consequently, a user can receive the diagnostic reading support service without hindrance.

The diagnostic reading terminal 51 extracts a necessary item such as a final compression ratio of an image out from the received operation history file on the basis of a setting table set in advance (step S202). Then, the diagnostic reading terminal 51 displays the extracted item on a display together with the image (step S203).

A diagnostic reading doctor performs diagnostic reading while looking at this image (step S204), converts a result of the analysis into data of a predetermined format such as an attached file of an electronic mail, and transmits the data to the image storage server 3 as a diagnostic reading report through the public line 50 on the basis of a communication protocol such as TCP/IP (step S205). If the diagnostic reading doctor has an opinion about a compression ratio of the image or the like, the diagnostic reading doctor writes the opinion in the diagnostic reading report. In particular, when a report on a result of diagnostic reading in the medical facility H is attached and a judgment in the report is different from that in the diagnostic reading report, it is examined carefully whether the compression ratio of the image or the like affects the result of the analysis.

When the image storage server 3 receives the diagnostic reading report transmitted from the diagnostic reading terminal 51, in response to the diagnostic reading report, the image storage server 3 displays the diagnostic reading report on the display according to processing by a not-shown CPU (step S206). Therefore, according to this embodiment, it is possible to obtain evaluation of a specialist on the outside concerning a compression ratio of an image file as described above and set a compression ratio more objectively.

Figure 15:
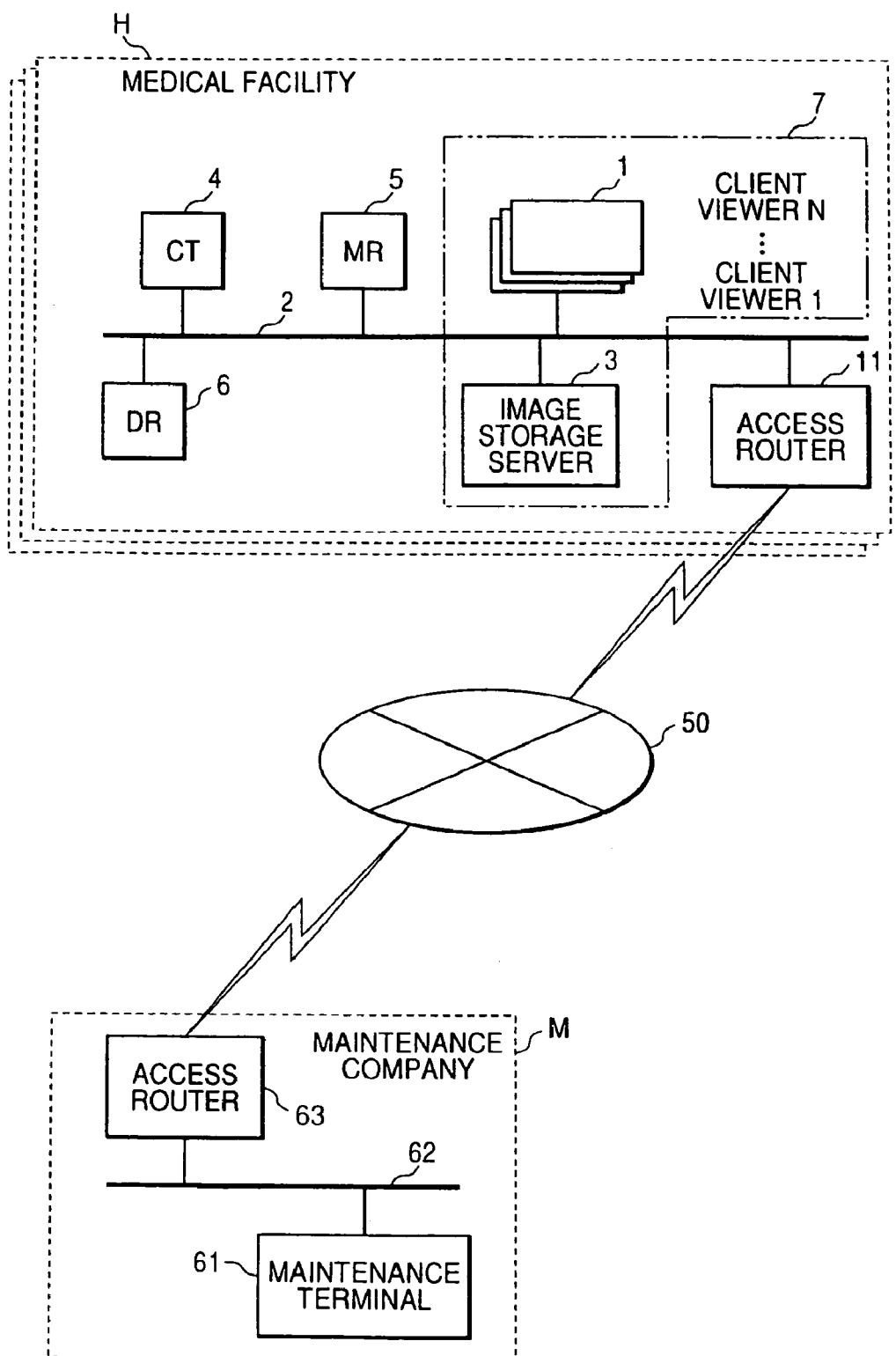
FIG. 15 is a diagram schematically showing an image storage and display system according to a third embodiment of the invention.

Lastly, an image storage and display system according to a third embodiment of the invention will be explained with reference to the drawings. As shown in FIG. 15, the image storage and display system according to this embodiment is basically different from that in the second embodiment in that the image storage and display system is connected to a maintenance company M, which maintains the image storage and display system with remote control via a public line or the like, instead of the diagnostic reading center on the outside. Other components of the image storage and display system are substantially the same as those in the second embodiment. Thus, the components are denoted by the same reference numerals and signs and explanations of the components are omitted.

A maintenance terminal 61, which constitutes a service system, is arranged on the maintenance company M side in a remote location that should control maintenance of the image storage and display system 7. As shown in FIG. 15, the maintenance terminal 61 and the image storage server 3 and the client viewer 1 are capable of communicating various control signals and various kinds of information concerning maintenance of the image storage and display system via the public line 50 on the basis of a standardized communication protocol such as TCP/IP.

FIG. 16 is a flowchart for explaining a flow of processing of the maintenance terminal 61. The maintenance terminal 61 acquires an operation history file from the image storage servers 3 in plural medical facilities, which are connected the maintenance terminal 61, via the public line 50 periodically or as required (step S301). The maintenance terminal 61 may be adapted to be capable of receiving an operation history file from the diagnostic reading center and the like explained in the second embodiment in addition to these medical facilities. In this case, information such as a result and an evaluation of a report concerning an image, a result obtained by a conference, and an evaluation result obtained by an examination facility such as a diagnostic reading center, information of date and time when the information is fed back to the medical facilities, and the like are also transmitted. Note that, again, data revealing inside information of the medical facilities H is converted into a secret information setting database and transmitted as in the second embodiment.

Subsequently, the maintenance terminal 61 extracts a necessary item such as a final compression ratio of an image from the received operation history file on the basis of a setting table set in advance (step S302). Then, the maintenance terminal 61 analyzes a state of a compression ratio of the image storage and display system 7 on the basis of the extracted item (step S303) and displays a result of the analysis (step S304).

According to this embodiment, the maintenance company M can grasp a state of use of the image storage and display system 7. Thus, when an image storage and display system is shipped anew, it is possible to set various parameters such as a compression ratio of an image to a value closer to a real state of use.

As described above, according to the image storage and display system and the image storage and display method according to the invention, it is possible to reduce time for, for example, adjustment of a compression ratio of an image by a user or a service person by automatically optimizing the compression ratio.

In the invention, even if the image storage and display system is forced to change a compression ratio after optimization, the image storage and display system can cope with the change easily and can automatically set an optimum compression ratio in the present system operation. Thus, there is an effect that the image storage and display system can be utilized as efficiently as possible.

According to the image storage and display system according to the invention, it is possible to maintain the image storage and display system with remote control.

The embodiments explained above are only for explanation and does not limit a scope of the invention. Therefore, those skilled in the art are capable of adopting an embodiment in which respective elements or all elements in the embodiments are replaced with equivalent ones. These embodiments are also included in the scope of the invention.

What we claim is:

1. An image storage and display system comprising:
   an image storage server that includes an image storing unit for storing an image as data; and
   an image display terminal that is connected to the image storage server via a network and that displays the image sent from the image storage server, wherein
   the image storage server includes:
   an information managing unit that manages a history formed operation information concerning an operation that affected a quality of the image in the image display terminal; and
   an image compressing unit that compresses the image on the basis of the history, and stores a compressed image as the image in the image storing unit,
   wherein the information managing unit calculates a first period in which there is no free space in the image storing unit on the basis of the stored storage history; and
   wherein after elapse of the first period or a second period that does not exceed the first period set in advance, the information managing unit sets the image compression ratio on the basis of the history, and stores the compressed image in the image storing unit.

2. An image storage and display system according to claim 1, wherein
   the information managing unit manages environmental information including apparatus information on the network itself, apparatus information on apparatuses connected to the network, and information on applications installed in the respective apparatuses, and
   the image compressing unit compresses the image on the basis of the history and the environmental information.

3. An image storage and display system according to claim 1, wherein
   the information managing unit manages information on users of the image display terminal, and
   the image compressing unit compresses the image on the basis of the history and the information on users.

4. An image storage and display system according to claim 1, wherein the image compressing unit applies at least one image compression form to one image to generate plural compressed images with different image compression ratios, and stores the compressed images in the image storing unit.

5. An image storage and display system according to claim 1, wherein
   the image display terminal includes an input unit that inputs the image compression ratio of an original image as the image, and re-inputs the image compression ratio of the compressed image, and
   the image compressing unit generates the compressed image with the image compression ratio received by the input unit, and transmits the compressed image to the image display terminal.

6. image storage and display system according to claim 5, wherein, when the image compression ratio is not inputted by the input unit, the image compressing unit transmits the compressed image with a highest image compression ratio to the image display terminal.

7. An image storage and display system according to claim 1, wherein the information managing unit deletes other compressed image and original image from the image storing unit when the information managing unit stores the compressed image in the image storing unit.

8. An image storage and display system according to claim 1, wherein the information managing unit manages the history during the second period, and, every time when a new history is obtained, the information managing unit resets the image compression ratio, and stores the compressed image in the image storing unit, and, after the second period elapses, the information managing unit deletes other compressed image and original image from the image storing unit.

9. An image storage and display system according to claim 1, wherein the history includes an image compression form that the image display terminal can cope with.

10. An image storage and display system according to claim 1, wherein the information managing unit manages the history even after elapse of the second period.

11. An image storage and display system according to claim 2, wherein, on the basis of the apparatus information, the image storage server judges whether a program for image display is transmitted to the image display terminal to cause the image display terminal to execute the program or only a program for image display executed in the image storage server is transmitted.

12. An image storage and display system according to claim 1, further comprising:
a diagnostic reading support system, connected to the image storage server via the network, configured to generate a diagnostic reading report in a diagnostic reading report terminal while displaying medical images in the image display terminal, and to transmit the diagnostic reading report to the image storage server, wherein
the diagnostic reading support system acquires information on required image compression on the basis of a table set in advance, and generates the diagnostic reading report with a reference screen using an image based on the information.

13. An image storage and display system according to claim 1, wherein
the information managing unit acquires information on specifications of the image display terminal and information on applications running on the image display terminal as environmental information of the system,
the image compressing unit selects candidate compression ratios on the basis of the specification information, the application information, and the operation history information and transmits the selected candidate image compression ratios to the image display terminal,
the image display terminal includes a setting device that displays the candidate image compression ratios, and sets the image compression ratio among the candidate image compression ratios, and
the image compressing unit compresses the image in accordance with the image compression ratio set by the setting device.

14. An image storage and display system according to claim 1, wherein the image compressing unit selects different plural candidate image compression ratios, and compresses the image at the plural image compression ratios to store the compressed images in the image storing unit.

15. An image storage and display system according to claim 1, wherein the image compressing unit transmits a signal for requesting confirmation on whether the image compression is started to the image display terminal before starting the image compression.

16. An image storage and display system according to claim 1, wherein the image compressing unit transmits a signal for requesting designation of a desired image compression ratio, and compresses the image with the desired image compression ratio.

17. An image storage and display system according to claim 1, wherein, to a specified image, the image compressing unit does not apply an image compression ratio set on the basis of information on compression of the image.

* * * * *